United States Patent [19]

Lin et al.

[11] Patent Number: 4,919,871

[45] Date of Patent: Apr. 24, 1990

[54] FORMING GLASS FIBERS FROM SOL-GEL COMPOSITIONS

[75] Inventors: Chia-Cheng Lin, Hampton Township, Allegheny County; Roger C. Milliron, Jr., Lower Burrell, both of Pa.

[73] Assignee: PPG Industries, Inc., Pittsburgh, Pa.

[21] Appl. No.: 293,403

[22] Filed: Jan. 4, 1989

[51] Int. Cl.$^5$ .............................................. D01F 9/08
[52] U.S. Cl. ...................................... 264/82; 264/56; 264/65; 264/204; 264/211.11; 264/211.14
[58] Field of Search ...................... 264/82, 65, 211.11, 264/204, 56, 83, 211.14; 65/401, 375, 17

[56] References Cited

U.S. PATENT DOCUMENTS 3,760,049  9/1973  Borer et al. ............................ 264/57
3,846,527  11/1974  Winter et al. ......................... 264/63

FOREIGN PATENT DOCUMENTS 0199328  10/1986  European Pat. Off. .
60-27615  2/1985  Japan ..................................... 65/901
62-297236  12/1987  Japan .
62-297237  12/1987  Japan .

OTHER PUBLICATIONS

Journal of Non-Crystalline Solids 63(1984) 183-191, North Holland Amsterdam; Segal D. L.; "Sol-Gel Processing: Routes to Oxide Ceramics Using Colloidal Dispersions of Hydroxide Oxides and Alkoxide Intermediates", Elsevier Science Publishers B.V.

Primary Examiner—Hubert C. Lorin
Attorney, Agent, or Firm—Donna L. Seidel

[57] ABSTRACT

A method for dry-spinning a metal alkoxide sol to form fibers which may be gathered and wound in a conventional manner, wherein the atmosphere in the spin chamber comprises ammonia to dry the fibers to a nonsticky state.

10 Claims, 1 Drawing Sheet

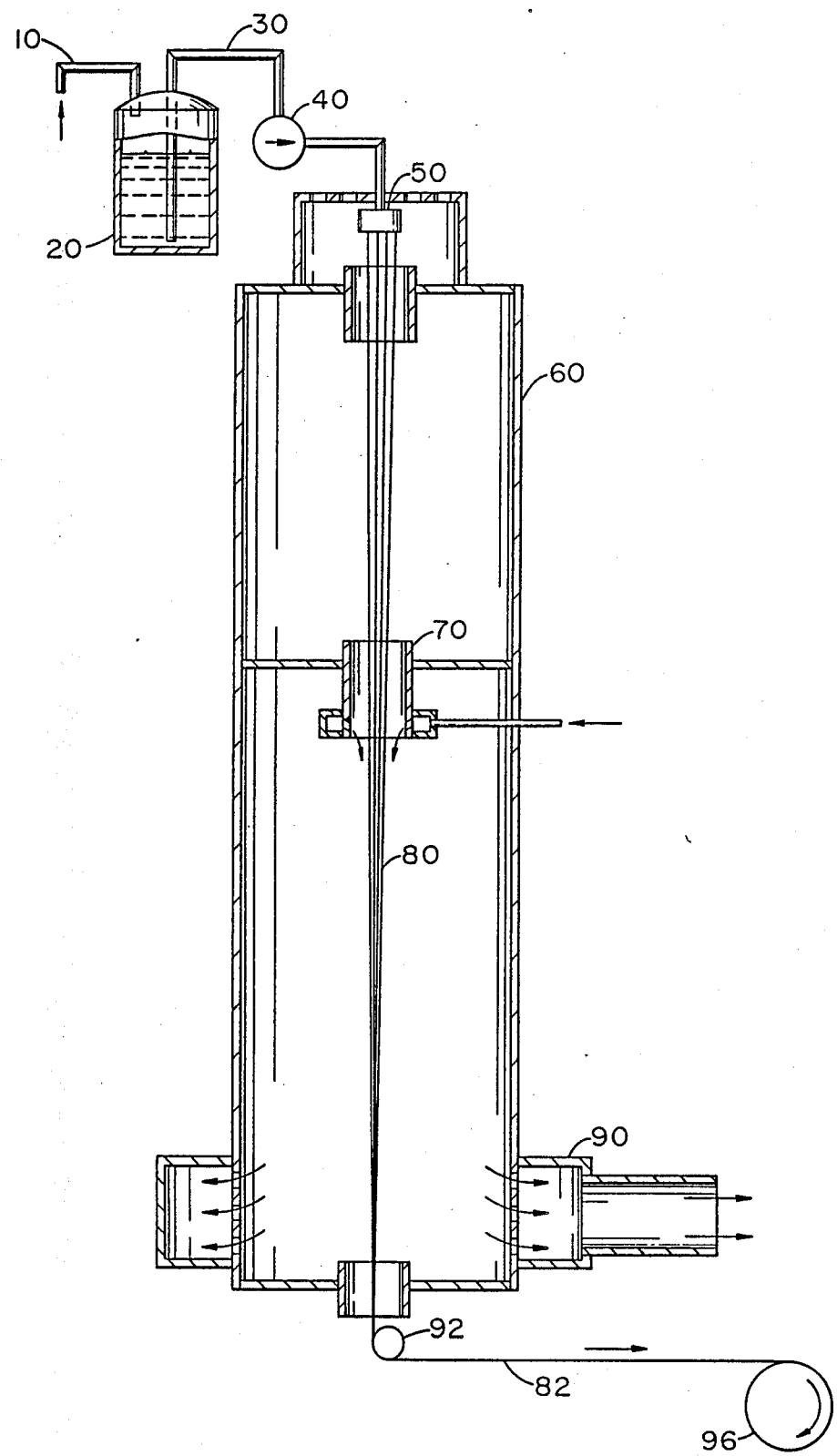

FORMING GLASS FIBERS FROM SOL-GEL COMPOSITIONS

FIELD OF THE INVENTION

The present invention relates generally to the art of spinning glass fibers from sols comprising hydrolyzed alkoxides, and more particularly to dry spinning of silica glass fibers from silicate sols.

BACKGROUND

U.S. Pat. No. 3,760,049 to Borer et al discloses extruding a viscous solution or dispersion of soluble or dispersed metal compounds through a spinnerette; drawing the green fibers in hot air, preferably as a strand; collecting the strand in a free-form, relaxed manner on a moving belt which is continuously passed through a furnace to remove volatiles and burn off organic material; and continuously pulling the resulting refractory fibers in a straight or linear form through a furnace at a higher temperature to densify, strengthen, straighten and/or modify the microstructure of the fibers or develop desired crystalline species therein.

U.S. Pat. No. 3,846,527 to Winter et al discloses inorganic fibers produced by dry spinning a solution, sol or dispersion of one or more metal compounds which would not normally be spinnable but are rendered spinnable by inclusion of a small amount of a linear polymeric substance characterized by a degree of polymerization in excess of 2,000 and a concentration of 0.001 to 5 percent in the spinning dope.

European Patent Application No. 86105496.3 published 29.10.86 discloses a fabric for a printed circuit substrate composed essentially of inorganic fibers having a non-circular cross-section.

Japanese Patent Application No. 61 (1986) 139,217 filed June 17, 1986, discloses a method for producing quartz glass fiber comprising hydrolyzing a silicon alkoxide solution, forming a gel fiber, and baking the gel fiber in two steps: the primary baking carried out in an oxidizing atmosphere at a temperature lower than 600° C. while applying a tension of 100 to 10,000 g/mm², and the secondary baking at a temperature of 600° to 1100° C. while applying the aforementioned tension.

Japanese Application No. 61 (1986) 139,244 filed June 17, 1986, discloses production of silica fiber by sol-gel processing wherein the spinning liquor composed of silica sol further comprises a silicon compound of the general formula $Y_1Y_2Y_3SiX$ wherein $Y_1$, $Y_2$ and $Y_3$ are an alkyl group, allyl group or aryl group and X is hydrogen, chlorine, bromine, iodine or OR where R is an alkyl group with 1 to 10 carbons.

D. L. Segal discloses in "Sol-Gel Processing: Routes to Oxide Ceramics Using Colloidal Dispersions of Hydrous Oxides and Alkoxide Intermediates", *Journal of Non-Crystalline Solids*, 63 (1984) 183–191, that spheres may be formed from a hydrous oxide sol dispersed as liquid droplets in an immiscible organic solvent. In external gelation, removal of anion from the sol droplets by passing ammonia gas or adding a long-chain amine to the solvent results in gel formation.

BRIEF DESCRIPTION OF THE DRAWING

FIG. 1 illustrates the fiber-forming apparatus used in the practice of the present invention. Line 10 supplies gas to pressurize pot 20 which contains a sol-gel composition of the present invention. Line 30 delivers the sol-gel composition through pump 40 to a fiber-forming spinnerette 50. Spin tube 60 contains the atmosphere controlled by collar 70 around the newly formed fibers 80. Exhaust hood 90 removes ammonia gas. Gathering means 92 draw the fibers 80 into a strand 82 which exits the spin tube onto take-up winder 96.

SUMMARY OF THE INVENTION

The present invention provides a method for producing glass fibers from sol-gel compositions, especially comprising silicon alkoxides, by extruding a viscous sol-gel composition through a spinnerette and drawing the continuously formed green fibers through an ammonia atmosphere to harden them so that the fibers may be collected without sticking together on a spin drum or take-up winder without prior heat treatment.

DETAILED DESCRIPTION OF THE PREFERRED EMBODIMENTS

The present invention provides an improved method for producing fibers from sol-gel compositions by extruding a sol of suitable viscosity through an orifice to form a fiber, and passing the fiber through an ammonia-containing atmosphere so that the fiber surface is not sticky. The fibers may thus be immediately wound without sticking together, and may be heated to densify and/or crystallize the composition at a later stage of production.

A sol is prepared by partially hydrolyzing an alkoxide of the general formula $$M(OR)_x$$

wherein M is an element which forms hydrolyzable alkoxides, R is an organic radical which forms hydrolyzable alkoxides, and x is the valence of M. Preferred alkoxides comprise silicon, although other metals such as aluminum, titanium, zirconium and mixtures thereof may be used. Preferred alkoxides comprise only hydrolyzable alkoxy groups so that no organic material remains in the oxide formed by the various hydrolytic polycondensation reactions $$M(OR)_x + yH_2O \longrightarrow M(OR)_{x-y}(OH)_y + yROH$$

$$M(OR)_{x-y}(OH)_y + M(OR)_x \longrightarrow \underset{(OR)_{x-y}}{\overset{(OH)_{y-1}}{M}}-O-\underset{(OR)_{x-1}}{M} + ROH$$

Preferred alkyl groups are methyl, ethyl, propyl and butyl, although higher alkyl groups may be used, as well as aryl and other hydrolyzable organic radicals. A particularly preferred hydrolyzable alkoxide is tetraethoxysilane (TEOS), $Si(OC_2H_5)_4$, or ethyl silicate 40, a partially condensed tetraethylorthosilicate.

A hydrolyzable alkoxide is preferably first dissolved in an appropriate solvent, preferably an alcohol, most preferably the alcohol formed by the hydrolyzable alkoxide. Then water is added to hydrolyze the alkoxide. The molar ratio of water to hydrolyzable alkoxide is preferably in the range of 1.7 to 2.0 to produce compositions with high solids contents and low molecular weight for optimum fiber stretching. An acid catalyst may be employed, preferably an inorganic acid such as nitric acid.

The hydrolysis and condensation reactions are allowed to proceed until the sol has a suitable viscosity for fiber-forming. Some of the solvent may be evaporated to increase the concentration and viscosity. A suitable room-temperature viscosity for dry jet spinning in accordance with the present invention is preferably 100 to 400 poise, more preferably 100 to 200 poises.

The sol-gel composition is contained in a closed pot into which a gas is supplied in order to feed the composition to a pump which applies sufficient pressure to extrude the composition through a suitable orifice, for example in a spinnerette, to form fibers. Preferably, helium is used to eliminate bubbles formed by air, nitrogen or $CO_2$ in the sol-gel composition. Containment means, typically characterized as a spin chamber, or in a preferred cylindrical form a spin tube, surround the uncured continuously forming fibers to prevent air currents from disrupting the fiber-formation.

The fibers are drawn, preferably vertically downward, through an atmosphere comprising ammonia. The atmosphere is typically air comprising about 0.05 to 5 percent ammonia gas, preferably about 1000 to 40,000 parts per million, more preferably about 10,000 to 30,000 parts per million. The air preferably enters the spin tube through an opening or openings in the top, and is drawn downward past the spinnerette and along the path of the fibers by induction resulting from the exhaust means, preferably located at the bottom of the spin tube.

The ammonia may be supplied by means of an ammonium hydroxide solution at the bottom of the spin tube from which buoyant ammonia vapor rises. Preferably, ammonia gas is added near the top of the spin tube below the spinnerette and exhausted near the bottom of the spin tube so that it flows parallel with the path of the fiber. The top of the spin tube is open to the ambient atmosphere so that air is continuously drawn down past the spinnerette to prevent ammonia from causing clogging of the orifices by premature gelation of the sol-gel composition.

The flow of air/ammonia is maintained sufficiently laminar to avoid disruption of the continuous fiber-forming. Air, ammonia or a mixture thereof may also be introduced into the spin tube by means of an air collar, an annular component outside the spinnerette with orifices angled downward.

The present invention will be further understood from the specific examples which follow.

EXAMPLE I

A sol is formed by mixing 520 grams of tetraethoxysilane (TEOS) with 235 grams of reagent grade ethanol at 60° to 65° C. A solution of 1.6 grams of nitric acid in 78.5 grams of deionized water is added to the sol in four increments at about 15 minute intervals, producing a sol with a water/TEOS molar ratio of 1.75. The tetraethoxysilane is allowed to hydrolyze for one hour at 60° to 65° C. The sol is then allowed to cool to ambient temperature. The sol is vacuum distilled at 50° C. in a rotary evaporator. After distillation, the sol is rediluted with ethanol to a solids content of 53 percent. The sol is then aged until it reaches the desired spinning viscosity. The sol is placed in a sealed reservoir pressurized with 30 pounds per square inch of helium. The pressure forces the sol into a gear driven pump which delivers the sol to a spinnerette. The sol is continuously extruded through a 4-hole spinnerette with hole diameters of 280 microns. The continuously extruded fibers are drawn vertically downward through a spin tube about 9 feet (about 2.74 meters) long containing an atmosphere comprising ammonia in air. The concentration of $NH_3$ is about 19,000 parts per million. After brief exposure to ammonia, the continuous fibers are non-tacky. The continuous non-tacky fibers are brought together by a guide to form a single compact strand. The continuous strand is then gathered on a take-up winder. After the strand is collected, it is fired to form the final silica fiber product. In this example, the fibers are placed in an oven programmed to raise the temperature 15° C. per minute. During this heating cycle, 200 cubic centimeters per minute of oxygen is introduced into the oven until the temperature reaches 500° C. The temperature is further raised to 850° C., at which the fibers are held for 5 minutes.

EXAMPLE II

A sol is formed as in Example I, except that the amount of water is 81 grams, thus producing a water/TEOS molar ratio of 1.8. Fibers are formed as in the previous example.

EXAMPLE III

A sol is formed as in the previous examples, except that the amount of water is 83.5 grams, thus producing a water/TEOS molar ratio of 1.85. Fibers are formed as in the previous examples.

EXAMPLE IV

A sol is prepared as in Example II using 81 grams of distilled water to produce a molar ratio of water to TEOS of 1.8. The sol is extruded through a spinnerette to form green fibers as in the previous examples. The continuous fibers are drawn vertically through an ammonia containing atmosphere. The concentration of ammonia is about 975 parts per million. Flexible transparent fibers are formed; however, the fibers remain sticky as they approach the winder.

EXAMPLE V

A sol is prepared as in the previous example. Fibers are formed and drawn as in the previous example, except that the ammonia concentration is 10,400 parts per million. The fibers formed are flexible, transparent and not sticky.

EXAMPLE VI

A sol is prepared, and fibers formed therefrom as in the previous example, except that the ammonia concentration is 11,375 parts per million. Flexible, transparent non-sticky fibers are formed as in Example V.

EXAMPLE VII

A sol is prepared, and fibers are formed as in the previous example, except that the ammonia concentration is 21,450 parts per million. The fibers are flexible, transparent and non-sticky.

EXAMPLE VIII

A sol is prepared, and fibers are formed as in the previous example, except that the ammonia concentration is 23,400 parts per million. Non-sticky flexible fibers are formed; however, the fibers are not transparent.

EXAMPLE IX

A sol is prepared, and fibers are formed as in the previous example, except that the ammonia concentration is 26,000 parts per million. Non-sticky fibers are formed; however, the fibers are not transparent, and are slightly brittle.

EXAMPLE X

A sol is prepared as in Example I with a water/TEOS molar ratio of 1.75, reacted to a viscosity of 130 poises. The composition is extruded through a four hole spinnerette as in the previous examples to form fibers which are passed through an ammonia atmosphere and continuously collected on a take-up winder at a winder speed of 250 feet (76.2 meters) per minute. In this example, the concentration of ammonia is continuously increased. Observation of the fibers exiting the spin chamber reveals that the fibers begin to dry at ammonia concentrations of 6500 to 9750 parts per million, and emerge completely dry at 13,000 ppm. Ammonia concentrations as high as 26,000 ppm continue to produce flexible transparent fibers, ranging in thickness from 44 to 51 microns.

EXAMPLE XI

A sol is prepared and formed as in Example X, except that the take-up winder speed is 386 feet (117.7 meters) per minute. Observation of the fibers exiting the spin chamber reveals that the fibers begin to dry at 9750 to 13,000 ppm ammonia and are completely dry at 19,500 ppm. At 29,250 ppm ammonia, flexible transparent fibers are formed. The higher take-up winder speed results in stretched thinner fibers of 32 to 43 microns, and also requires higher ammonia concentrations as a result of the shorter time the fibers spend in the spin chamber.

EXAMPLE XII

A sol is prepared by dissolving 520 grams of Ethyl Silicate 40 in 235 grams of ethanol. Ethyl Silicate 40 is a condensed form of tetraethylorthosilicate comprising 40 percent silica by weight of solids available from Union Carbide as ES-40. Hydrolysis is carried out with a water mole ratio of 1.1 by adding 50 grams of deionized water, containing 1.6 grams of nitric acid, in three 14 gram and one 9.6 gram increments at 15 minute intervals. The sol is allowed to hydrolyze at 60° C. for one hour, and then is held at 50° C. overnight. The hydrolyzed sol is then distilled, rediluted with ethanol to 53 percent solids, and aged to a room temperature viscosity of 129 poises. This composition is formed into fibers as in the previous examples. With a winder speed of 371 feet (113 meters) per minute, which is not stretching the fibers to their maximum, and ammonia concentration ranging from 11,375 to 26,000 ppm, fibers are formed ranging from 13.6 to 36.5 microns.

The above examples are offered to illustrate the present invention. Various sol-gel compositions may be used to produce fibers by dry-spinning in accordance with the present invention. Spinning parameters may be varied to suit the composition and to produce fibers of the desired thickness and properties. Ammonia may be provided directly in gaseous form or from ammonium-containing solutions. Volatile amines may also be used. The concentration of ammonia in the spin tube atmosphere will be a function of both the composition and the spinning parameters such as feed rate and take-up winder speed. The scope of the present invention is set forth in the following claims.

We claim:

1. A method for producing solid inorganic oxide fibers from a liquid metal alkoxide sol-gel composition comprising the steps of:
   a. forming a liquid sol of an alkoxide compound having the general formula $M(OR)_x$ wherein M is an element which forms hydrolyzable alkoxides, R is an organic radical which forms hydrolyzable alkoxides and x is the valence of M;
   b. hydrolyzing said alkoxide compound to a sufficient degree to provide a liquid sol of sufficient concentration and viscosity for fiber-forming;
   c. passing said sol through an orifice to form a fiber; and
   d. passing said fiber through a gaseous atmosphere to dry, wherein said gaseous atmosphere comprises ammonia in sufficient concentration such that the fiber may be wound without self-sticking.

2. A method according to claim 1, wherein M is selected from the group consisting of silicon, aluminum, titanium, zirconium and mixtures thereof.

3. A method according to claim 2, wherein R is selected from the group consisting of methyl, ethyl, propyl and butyl.

4. A method according to claim 3, wherein M is silicon and R is ethyl.

5. A method according to claim 4, wherein sol is hydrolyzed with water in a molar ratio of 1.7 to 2.0.

6. A method according to claim 5, wherein said sol has a solids content of 45 to 55 percent.

7. A method according to claim 6, wherein said sol has a room temperature viscosity of 100 to 300 poise.

8. A method according to claim 7, wherein said sol has a room temperature viscosity of 160 to 180 poise.

9. A method according to claim 8, wherein the concentration of ammonia is from 1000 to 40,000 parts per million.

10. A method according to claim 9, wherein the concentration of ammonia is from 10,000 to 30,000 parts per million.

* * * * *